United States Patent
Okuno et al.

(10) Patent No.: US 7,444,901 B2
(45) Date of Patent: Nov. 4, 2008

(54) TRANSMISSION CASE

(75) Inventors: Mitsutaka Okuno, Anjo (JP); Masahiro Hayabuchi, Anjo (JP); Masaaki Nishida, Anjo (JP); Satoru Kasuya, Anjo (JP); Nobukazu Ike, Anjo (JP)

(73) Assignee: Aisin AW Co., Ltd. (JP)

( * ) Notice: Subject to any disclaimer, the term of this patent is extended or adjusted under 35 U.S.C. 154(b) by 93 days.

(21) Appl. No.: 10/403,509

(22) Filed: Apr. 1, 2003

(65) Prior Publication Data

US 2004/0031352 A1 Feb. 19, 2004

(30) Foreign Application Priority Data

May 17, 2002 (JP) ............................. 2002-142976

(51) Int. Cl.
*F16H 57/02* (2006.01)
(52) U.S. Cl. .................................. 74/606 R
(58) Field of Classification Search .............. 74/606 R, 74/607; 280/784
See application file for complete search history.

(56) References Cited

U.S. PATENT DOCUMENTS

| | | | | | |
|---|---|---|---|---|---|
| 3,696,689 A | * | 10/1972 | Senter et al. | ................... | 74/609 |
| 3,719,843 A | * | 3/1973 | Dochterman | ................. | 310/89 |
| 3,723,781 A | * | 3/1973 | Schnitzler, Jr. | ............... | 310/51 |
| 3,772,938 A | * | 11/1973 | Johnson | ..................... | 74/606 R |
| 4,446,755 A | * | 5/1984 | Takahashi | .................. | 74/606 R |
| 4,474,278 A | * | 10/1984 | Miura | .................... | 192/113.34 |
| 4,752,257 A | * | 6/1988 | Karls et al. | .................... | 440/76 |
| 4,856,635 A | * | 8/1989 | Vlamakis | ................. | 192/70.12 |
| 4,858,500 A | * | 8/1989 | Harada et al. | ................. | 477/62 |
| 4,923,043 A | * | 5/1990 | Okuno | .................... | 192/70.12 |
| 4,991,702 A | * | 2/1991 | Ladin | ........................ | 192/85 C |
| 5,133,439 A | * | 7/1992 | Shellhause | ................ | 192/85 C |
| 5,152,190 A | * | 10/1992 | Jurgens et al. | ............ | 74/606 R |
| 5,848,662 A | * | 12/1998 | Sakaue | ........................ | 180/274 |
| 6,114,784 A | * | 9/2000 | Nakano | ........................ | 310/59 |
| 2002/0001715 A1 | | 1/2002 | Redondo et al. | | |

FOREIGN PATENT DOCUMENTS

| | | |
|---|---|---|
| JP | 03-249335 | 11/1991 |
| JP | 11-082645 | 3/1998 |
| JP | 2002-054723 | 2/2002 |

* cited by examiner

*Primary Examiner*—Chong H Kim
(74) *Attorney, Agent, or Firm*—Bacon & Thomas, PLLC

(57) ABSTRACT

A transmission case is provided with a housing enclosing a clutch and/or torque converter connected to an engine, and a shifting mechanism case enclosing a shifting mechanism in an oil-tight state that is connected to the housing. A focus for stress resulting from an impact load acting on the transmission case is formed as a frangible portion in the housing. Thus, damage to the transmission from an excessive load is limited to the housing, and by absorbing the impact from that damage, damage to the shifting mechanism case is prevented and oil leakage from the transmission case is avoided.

14 Claims, 4 Drawing Sheets

TRANSMISSION CASE

CROSS-REFERENCE TO RELATED APPLICATION

This application claims priority, under 35 USC 119, of Japanese Patent Application No. 2002-142976 filed May 17, 2002.

INCORPORATION BY REFERENCE

The disclosure of Japanese Patent Application No. 2002-142976 filed on May 17, 2002 is incorporated herein by reference in its entirety.

BACKGROUND OF THE INVENTION

1. Field of the Invention

The present invention relates to a transmission mounted in a vehicle, and in particular, relates to a case structure for a transmission.

2. Related Art

An automatic transmission mounted in a vehicle conventionally includes a hydraulic power transmission such as a fluid coupling that generally serves as a clutch and a torque converter, and a shifting mechanism in the form of a planetary gear set, a hydraulically-operated clutch, and a brake. The hydraulic power transmission and shifting mechanism are respectively accommodated within a converter housing and a shifting mechanism (gear) case. The shifting mechanism case interior serves as a space forming a portion of an oil passage for circulating automatic transmission fluid (ATF) for lubricating and cooling all parts of the shifting mechanism and, therefore, is an oil-tight space with respect to the exterior of the transmission. The converter housing covers only the outer side of the hydraulic power transmission, and serves as a structural member connecting the automatic transmission to the engine. Therefore, the interior space housing the shifting mechanism is separate and isolated from the interior space of the converter housing. The interior spaces of the shifting mechanism case and the converter housing are normally mutually isolated by the body of an oil pump serving as a partition wall. The pump itself is a hydraulic pressure source for supplying transmission hydraulic oil to each of the hydraulic power transmission and the hydraulic servos that operate the brakes and clutches of the shifting mechanism, and to other portions of the shifting mechanism.

The automatic transmission case mounted in a vehicle (as used herein "automatic transmission case" has reference to, collectively, both the converter housing and the shifting mechanism case), especially an automatic transmission case vertically mounted in a FR (front engine rear drive) vehicle, has a shifting mechanism case with an oblong and substantially cylindrical shape and, therefore, has relatively low strength in comparison to the converter housing that has a truncated cone shape with a short axial length and which, therefore, is a portion with greater strength by nature. Accordingly, conventionally, in order to ensure the strength of the shifting mechanism (gear) case, measures for ensuring strength by increasing the thickness of the case wall and providing ribs have been adopted.

Strength maintaining measures such as the above are effective for preventing deformation and damage to the automatic transmission case itself due to loads from vibrations and centrifugal force during normal vehicle travel. However, when the automatic transmission case is considered as a component of the drive train located between the engine and the propeller shaft, particularly, in the case of receipt of an extremely large offset impact load, it is extremely difficult for the automatic transmission case to endure such an impact. Maintaining strength against such an impact load by conventional measures, such as increasing wall thickness, have limitations due to reasons such as the occurrence of shrinkage during case casting and extreme increases in weight. But even if such problems could be resolved, depending on the size of the impact load, the conventional approach would not necessarily guarantee the prevention of damage. The same can also be said of a manual transmission case of an identical structure including a clutch housing enclosing a dry clutch that is provided in a front portion of a shifting mechanism (gear) case.

SUMMARY OF THE INVENTION

In view of the foregoing, it is an object of the present invention to provide a transmission case that represents a departure from the established approach to preventing damage by reinforcing the strength of the transmission case, by provision of a structure limiting the affects of damage to a minimum, i.e., a novel approach that recognizes avoidance of damage is difficult.

According to a first aspect of the present invention, when a large load impacts on the transmission case, a frangible portion of the housing acts as a focus for stress for the entire transmission case. Therefore, even when stress from the load exceeds the tolerance of the transmission case, the frangible housing portion absorbs the impact by breaking, and prevents damage to the shifting mechanism (gear) case. Therefore, according to the present invention, even in a situation where damage to the automatic transmission case cannot be avoided, damage can be limited to an inner portion of the converter housing portion that does not contain oil, oil leakage and damage to the oil-tight structure of the shifting mechanism can be prevented, and the overall affect of damage on the entire automatic transmission can be kept to a minimum.

The transmission case may have a frangible portion serving as a focus for stress and thereby effectively protecting against excessive offset loads potentially damaging to the transmission case. The portion of the transmission case serving as the focus for stress has an extremely simple structure. Where a slit serves as a focus for stress, it also serves as an air hole for cooling the clutch within the housing, and further allows reduction of the weight of the transmission case, since the wall thickness of the slitted portion of the housing wall is reduced. Also, the slitted portion serves as an effective focus for stress, identically for offset loads from the right or left on the transmission case.

The portion of the transmission case which serves as the focus for stress may be structured such that noise from the transmission is prevented from passing therethrough, while also preventing the penetration of foreign objects into the housing interior.

In particular, the present invention is applicable to an automatic transmission mounted with its longest dimension extending along the longitudinal dimension of the vehicle, wherein the possibility of damage from an offset load is high, and the effects of damage to the transmission as a whole can be kept to a minimum.

In addition, according to a second aspect of the present invention, when a large offset impact load acts on the transmission case, slits formed on both sides of the housing function as rupture (frangible) portions and, even if stress from the load exceeds the tolerance of the transmission case, the housing absorbs the impact by breaking at the slits, thereby preventing damage to the shifting mechanism (gear) case. Therefore, in a situation where damage to the transmission case by a large offset load cannot be avoided, damage can be limited to a portion of the housing portion that does not contain oil, oil leakage can be prevented and damage to the oil-tight structure of the gear case can be prevented. The effects of damage to the entire transmission are thereby kept to a minimum.

DETAILED DESCRIPTION OF THE PREFERRED EMBODIMENT

Figure 1:
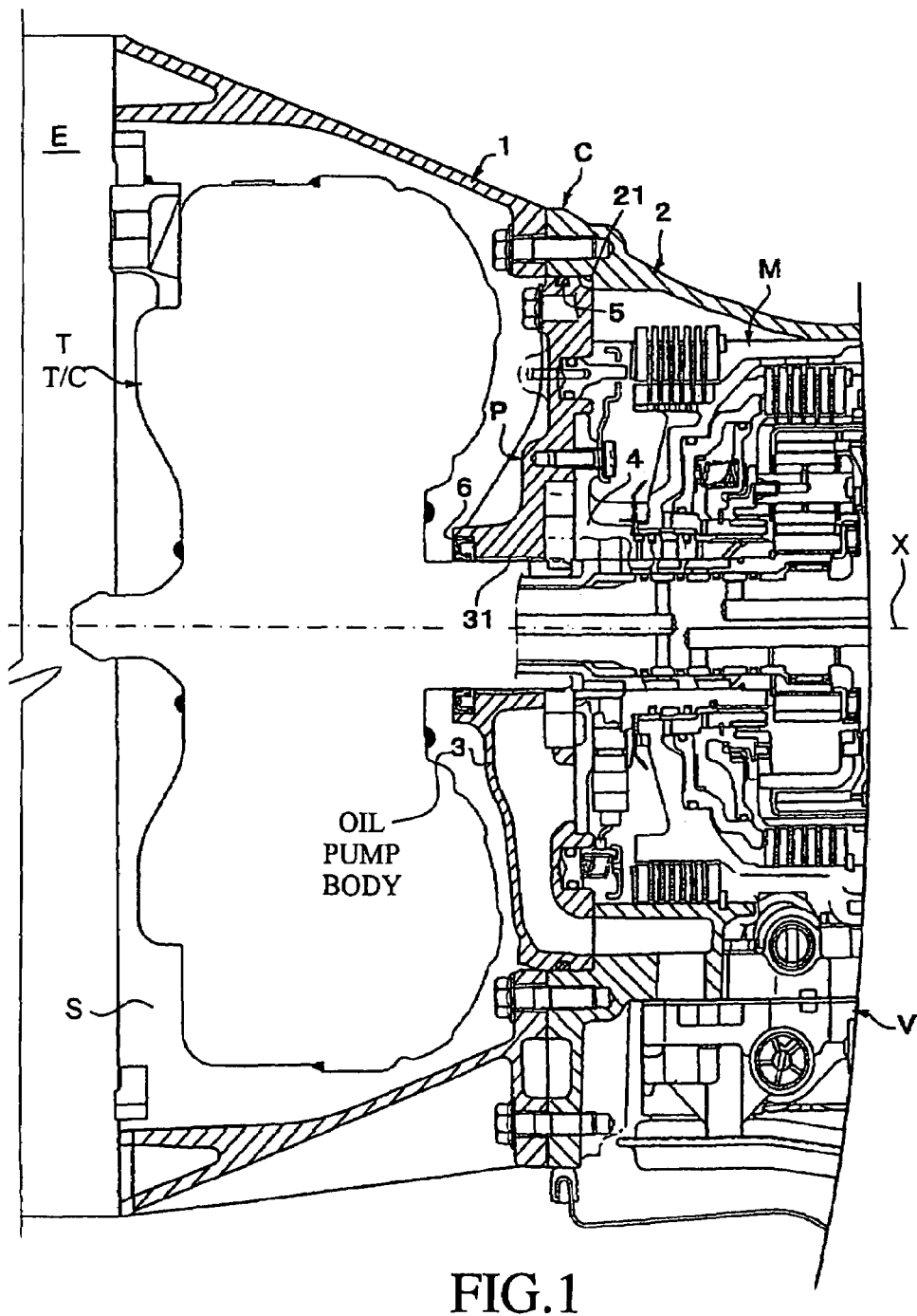
FIG. 1 is an axial partial cross-sectional view of an automatic transmission according to an embodiment of the present invention.

Hereinafter, an embodiment of the present invention will be described with reference to the accompanying drawings. FIG. 1 is an axial partial cross-sectional view of an automatic transmission, along longitudinal axis X, according to an embodiment of the present invention, wherein only the cross-section of the automatic transmission case is shown with hatching. As shown in FIG. 1, the automatic transmission of this embodiment is provided with an automatic transmission case C including a converter housing 1 connected to an engine E and enclosing a torque converter T (shown only by its cross-section peripheral shape in the figure) which is a hydraulic power transmission, and a shifting mechanism case 2 enclosing a shifting mechanism M connected oil-tight to the converter housing 1.

The converter housing 1 is formed in a generally cylindrical hollow truncated cone shape with an approximately uniform wall thickness, and has an open end (left side in the figure) with a major diameter joining with the engine E, and a second open end joining with the shifting mechanism case 2 and having a minor diameter, the engine E, housing 1 and case 2 being arranged in series on longitudinal axis X. The entire periphery of the torque converter T is enclosed by the converter housing 1. In addition, the upper and lower portions of the housing are reinforced with a plurality of ribs provided on the exterior surface and extending axially.

The shifting mechanism case (gear case) 2 has a generally cylindrical shape that is hollow with a bottom and an open end that joins with the converter housing 1. A rear end (not shown) of the shifting mechanism case is closed excluding axial through holes. The diameter of the circumference of the shifting mechanism case, excluding the bottom surface decreases gradually toward the rear. The bottom surface has an opening fitted with a valve body V, serving as a hydraulic pressure control device for the shifting mechanism, and provides a flat planar surface for mounting of the valve body V. A round hole 21 for accommodating an oil pump is formed in the open end joining the converter housing 1.

The converter housing 1 and the shifting mechanism case 2 are fixed together at their mating flange portions radially extending from joining surfaces, secured with a plurality of bolts. Isolating walls which serve to isolate the interiors of converter housing 1 and the shifting mechanism case 2 from each other are provided therebetween. An oil pump P provides shaft support for the torque converter T and the shifting mechanism M. The oil pump P has a pair of pump gears, a generally discoid oil pump body 3 enclosing the pair of pump gears with a shaft through hole 31 formed at its center, forming an oil supply passage for hydraulic oil as well as an intake and discharge oil passage. An oil pump cover 4 has a discoid cover portion closing an open end of the gear housing, and a boss portion extending axially from the cover portion with a shaft through hole formed at its center serving as an oil passage connected to the oil supply passage.

The outer diameter of the oil pump body 3 corresponds to the inner diameter of the circular hole 21 at the open end of the shifting mechanism case 2, and the junction between the outer peripheral surface of the oil pump body 3 and the mating inner peripheral surface of the shifting mechanism case 2 is hermetically sealed by an O-ring 5. A pump hub connected to the pump of the torque converter T is inserted into the shaft through hole 31 of the oil pump body 3 and is drivably connected to the oil pump gears. Moreover, the clearance between the outer peripheral surface of the pump hub and an inner peripheral surface of the oil pump body surrounding the shaft through hole 31 of the oil pump body 3 is hermetically sealed by an oil seal 6. Thus, the converter housing 1 and the shifting mechanism 2 are isolated from each other in an oil-tight manner by the oil pump body 3 serving as an isolating wall. Thus, lubricating oil is not present in the space S within the converter housing 1 enclosing the torque converter T, whereas lubricating oil is present in the interior of the shifting mechanism case 2 which receives oil from a shaft oil passage and in the interior of the torque converter T linked to the shaft oil passage.

In accordance with the present invention, when damage to the automatic transmission case C cannot be avoided, the converter housing 1 portion serves as a frangible structural portion for protecting the shifting mechanism case 2. This structure is based upon the concept that damage to the transmission case C is better borne by the converter housing 1 than by the shifting mechanism case 2 from the viewpoint of preventing the occurrence of oil leakage.

Figure 2:
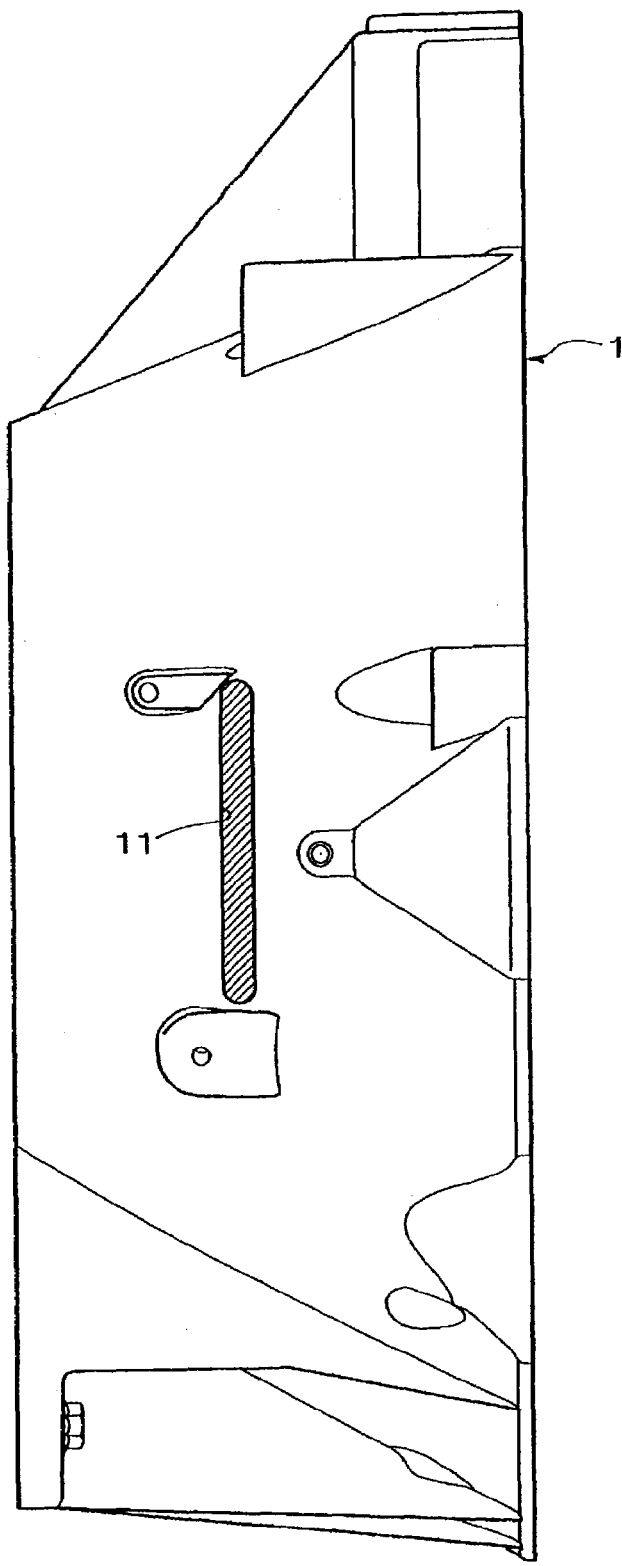
FIG. 2 is a right side view of a converter housing of the automatic transmission shown in FIG. 1.
Figure 3:
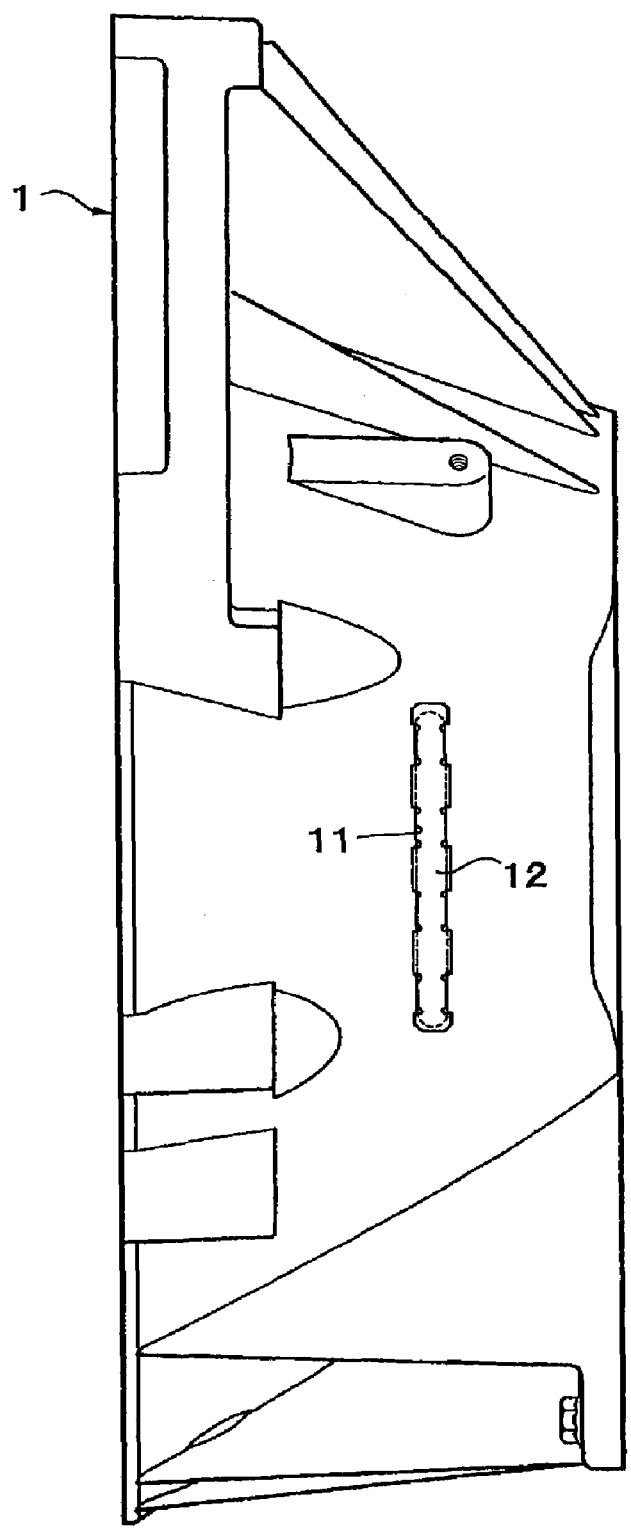
FIG. 3 is a left side view of the converter housing of FIG. 2.

Based upon the foregoing concept, as shown in the right and left side views of FIGS. 2 and 3, a portion 11 for focus of stress from an impact load acting on the automatic transmission is formed in the converter housing 1. When a load acts on the converter housing 1 that exceeds its strength, cracks should start at that portion 11.

Figure 4:
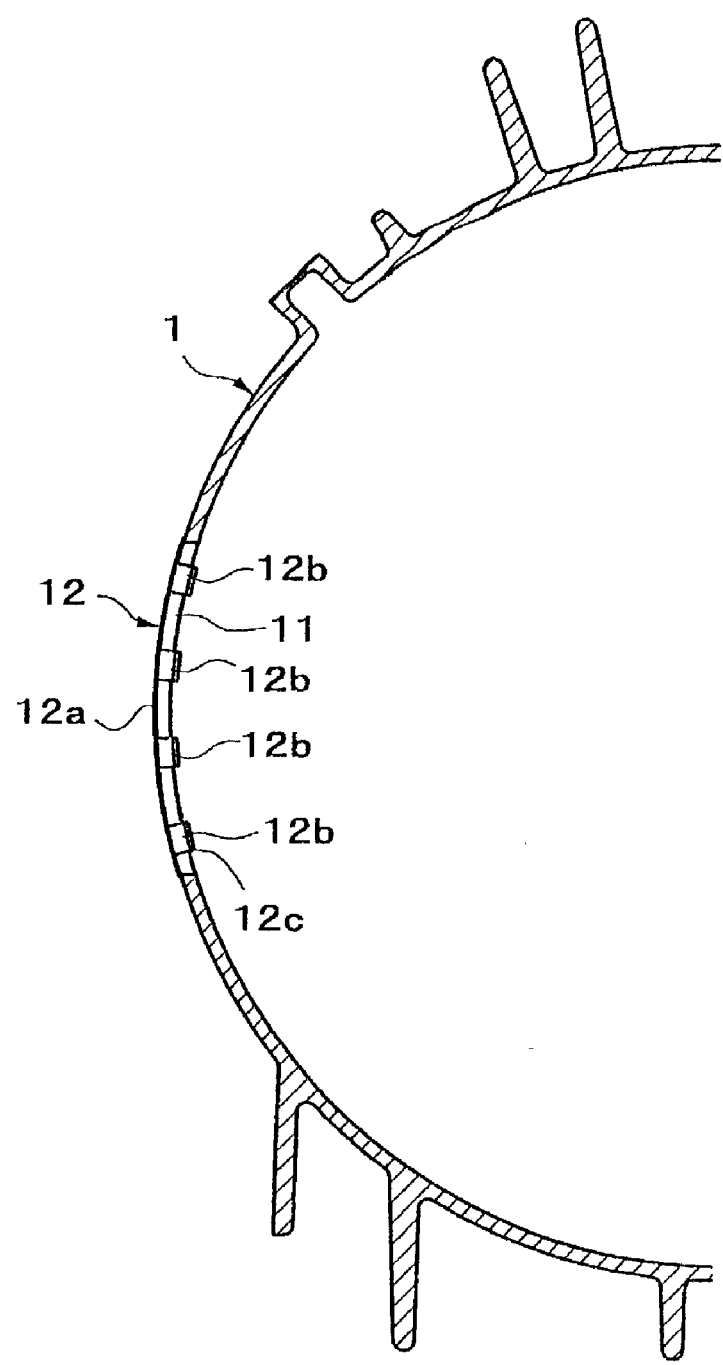
FIG. 4 is a partial cross-sectional view of the converter housing of FIG. 2.

In the illustrated embodiment, the frangible portion 11 for focus of stress, as illustrated by the area with hatching in FIG. 2 and as shown in cross-section in FIG. 4, is structured as an oval slit 11 penetrating the peripheral wall of the converter housing 1. The reason for the slit 11 penetrating the peripheral wall of the converter housing 1 is based on the finding that when a wall of a thinness for ensuring the flow of materials during casting is left in the slit 11, the thin wall diffuses stress, resulting in a failure of the frangible portion to fulfill its function as a focus for stress that guarantees breakage will start from there.

The slit 11 is provided at a location substantially central relative to the axial dimension (in side view) of the converter housing 1, and its length extends circumferentially. The circumferential length of this slit 11 defines the strength of the yield or focus point and the force required to cause breakage. Thus, the length of slit 11 is determined so that fracturing starts before damage to the shifting mechanism case 2 occurs, when an excessive load acts on it, and is expressed as a proportion to the entire length of the circumference at the converter housing 1 at the location of slit 11. The width of the slit 11 is not necessarily critical, nor is it derived from a relationship with the length of the slit 11. However, it has been found, for example, that one slit shape which reliably starts fracturing when an excessive load is received on the housing, while also maintaining sufficient strength against stress from various types of normal loads, has a length of 10 cm and ends shaped as arcs with a radius of 5 mm.

Slits 11 are formed at substantially symmetrical positions on opposing sides of the converter housing 1, such as shown in FIGS. 2 and 3, so as to uniformly react to an offset load from either the right or left. More specifically, when an impact load is horizontally offset and acts on a shaft end of the case, a compressed load acts on the offset side while a tensile load acts on the opposite side. The case then fractures starting at the slit 11 on the side receiving the tensile load. Hence, through such a symmetrical arrangement of the slits 11, when the automatic transmission receives a load on the right side (side shown in FIG. 2), the slit 11 of the opposite left side (side shown in FIG. 3) expands to start a fracture. Conversely, when a load is received on the left side (side shown in FIG. 3), the slit 11 of the opposite right side (side shown in FIG. 2) expands to start a fracture.

In the case where the slit 11 penetrating the converter housing 1 is left open, the slit 11 acts as an air hole and helps in cooling the torque converter T but, on the other hand, creates concerns such as noise passing from the shifting mechanism M to the converter housing 1 and noise generated from the torque converter T escaping through the slit 11, in addition to the penetration of rain and foreign objects through the slit 11. As countermeasures for such problems, as shown in FIGS. 3 and 4, the slit 11 can be covered with a blocking material. Such a blocking material may be any appropriate material, however the blocking material shown here is formed as a cover 12 made of a synthetic resin material covering an opening of the slit 11, connected around the periphery of the slit 11 by pawl portions 12c that engage an inner side corner portion of the slit 11, and that extend from ends of a plurality of (8 in this example) flexible foot portions 12b on both sides of a cover surface 12a.

Such a blocking material, for example even one such as a filling material filling the slit 11 that is different from the cover in the above example, must not hinder the broadening deformation in the lateral direction of the slit 11 that leads to fracturing due to an offset load and, therefore, it must not have a significant effect on the function of the slit 11 as a focus for stress.

As described above in detail, in this preferred embodiment, when a large offset impact load acts on the automatic transmission case C, which is most likely to cause damage to the transmission case C, the slit 11 running circumferentially in the converter housing 1 functions as a frangible portion for the entire automatic transmission case C and, even if stress from the load exceeds the tolerance of the automatic transmission case C, the converter housing 1 portion absorbs the impact by breaking starting from the slit 11, thereby preventing damage to the shifting mechanism case 2. Therefore, even in a situation where damage to the automatic transmission case C cannot be avoided, damage can be limited to the converter housing 1 portion that does not contain oil, oil leakage can be prevented with the prevention of damage to the shifting mechanism 2 portion which is an oil-tight structure, and the effects of damage on the entire automatic transmission can be kept to a minimum.

In addition, the slit 11 is a focus for stress having an extremely simple structure. Also, the slit 11 provides ventilation which allows cooling the torque converter T within the converter housing 1, and further allows the weight of the automatic transmission case C to be reduced, since the wall thickness of the slit 11 portion of the converter housing 1 wall is reduced. Moreover, by symmetrically providing slits 11 on opposing sides of the converter housing, the slits 11 function identically for loads received on the left and right sides.

Furthermore, when the slit 11 is covered with blocking material 12, noise from the automatic transmission can be prevented from passing through the portion for focus of stress, e.g., slit 11, while also preventing the penetration of foreign objects into the interior of the converter housing 1.

While the present invention has been described based upon a preferred embodiment, the present invention is not limited to the automatic transmission of the described preferred embodiment and is widely applicable to other automatic transmissions with various different structures, for example, a transmission exclusively for a front engine front drive (FF) vehicle and a transmission exclusively for a four-wheel-drive (4WD) vehicle; and furthermore, other types of transmissions such as a manual transmission with a dry clutch enclosed within a housing. Also, while in the described preferred embodiment, the slit 11 extends strictly circumferentially of the converter housing 1, modification such as a bent or curved shape or an inclined arrangement of the slit, may be adopted when the circumferential arrangement cannot be used due to restrictions of the converter housing shape.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A transmission case provided with a housing enclosing a clutch, the housing being arranged axially between and connected to an engine and a shifting mechanism case enclosing a shifting mechanism in an oil-tight state, said housing and said shifting mechanism case being bolted directly together and arranged on an axis of the transmission case, wherein
    a frangible portion formed by plural slits is located at substantially symmetrical positions on opposing sides of the housing and penetrating a side portion of a peripheral wall of the housing, each of said slits having its longest dimension extending circumferentially relative to the axis of the transmission case and opening directly into a space within the housing that does not contain oil.

2. The transmission case according to claim 1, wherein the frangible portion is a focus portion for stress generated from a load offset in a horizontal direction and acting on the axis of the transmission case.

3. The transmission case according to claim 1, wherein the plural slits are covered to prevent passage of foreign matter therethrough.

4. The transmission case according to claim 1, wherein the clutch is a hydraulic power transmission.

5. A transmission case provided with a housing enclosing a clutch connected to an engine, and a shifting mechanism case enclosing a shifting mechanism in an oil-tight state connected to the housing, said housing, said engine and said shifting mechanism case arranged on a single longitudinal axis, said housing having plural slits located at substantially symmetrical positions on opposing sides of the housing, penetrating a peripheral wall of the housing and opening directly into a space around the clutch and containing no oil, each of said slits having its longest dimension extending circumferentially of the housing and the longitudinal axis.

6. A transmission case according to claim 1 wherein the plural slits are located substantially central relative to the axial length of the surface in which the slits are formed.

7. A transmission case according to claim 5 wherein the plural slits are located substantially central relative to the axial length of the surface in which the slits are formed.

8. A transmission case according to claim 1 wherein the plural slits are identical.

9. A transmission case according to claim 5 wherein the plural slits are identical.

10. A transmission case according to claim 6 wherein the plural slits are identical.

11. A transmission case according to claim 7 wherein the plural slits are identical.

12. A transmission case according to claim 4 wherein the slits are located radially outward of the hydraulic power transmission.

13. A transmission case according to claim 12 wherein the hydraulic power transmission is a torque converter.

14. A transmission case according to claim 5 wherein said clutch is a torque converter.

* * * * *